(12) United States Patent
Nakai et al.

(10) Patent No.: US 12,325,787 B2
(45) Date of Patent: Jun. 10, 2025

(54) ELASTOMER COMPOSITION AND ACTUATOR AND SENSOR

(71) Applicants: TOYODA GOSEI CO., LTD., Kiyosu (JP); ASM INC., Chiba (JP)

(72) Inventors: Takanori Nakai, Kiyosu (JP); Katsunari Inoue, Chiba (JP)

(73) Assignees: TOYODA GOSEI CO., LTD., Aichi-pref. (JP); ASM INC., Kashiwashi (JP)

( * ) Notice: Subject to any disclaimer, the term of this patent is extended or adjusted under 35 U.S.C. 154(b) by 842 days.

(21) Appl. No.: 17/620,890

(22) PCT Filed: Jun. 11, 2020

(86) PCT No.: PCT/JP2020/023007
§ 371 (c)(1),
(2) Date: Dec. 20, 2021

(87) PCT Pub. No.: WO2020/262017
PCT Pub. Date: Dec. 30, 2020

(65) Prior Publication Data
US 2022/0348768 A1    Nov. 3, 2022

(30) Foreign Application Priority Data

Jun. 24, 2019 (JP) .................................. 2019-116461

(51) Int. Cl.
*C08L 101/00* (2006.01)
*C08J 5/18* (2006.01)

(52) U.S. Cl.
CPC .............. *C08L 101/00* (2013.01); *C08J 5/18* (2013.01); *C08J 2399/00* (2013.01);
(Continued)

(58) Field of Classification Search
CPC .............. C08L 101/00; C08L 2203/20; C08L 2312/00; C08J 5/18; C08J 2399/00;
(Continued)

(56) References Cited

U.S. PATENT DOCUMENTS 6,828,378 B2 * 12/2004 Okumura ............. C09D 105/16
525/461
2009/0312490 A1    12/2009 Ito et al.
(Continued)

FOREIGN PATENT DOCUMENTS

JP    2011-241401 A    12/2011
JP    2016-194026 A    11/2016
(Continued)

OTHER PUBLICATIONS

International Search Report of the International Searching Authority mailed Aug. 25, 2020 for the corresponding International application No. PCT/JP2020/023007(and English translation).
(Continued)

*Primary Examiner* — Emily P Pham
(74) *Attorney, Agent, or Firm* — Posz Law Group, PLC

(57) ABSTRACT

Provided is an elastomer which is suitable for application in actuators or sensors, and which exhibits an appropriately low initial elastic modulus in a low deformation region.
An elastomer composition containing the following components (A) to (D):
component (A): a polyrotaxane;
component (B): a crosslinking agent containing a second linear molecule having a molecular weight of 1,200 to 7,000, and a functional group disposed at both ends of the second linear molecule;
component (C): a double-reactive component having a reactive group at both ends; and
component (D): a single-reactive component having a reactive group at only one end, wherein at least a portion of the
(Continued)

functional group in the component (B) is directly or indirectly bonded to the cyclic molecule in the component (A), and the elastomer composition exhibits an initial elastic modulus of 0.6 to 2 MPa.

10 Claims, 3 Drawing Sheets

(52) U.S. Cl.
CPC ........ *C08J 2467/04* (2013.01); *C08J 2471/02* (2013.01); *C08L 2203/20* (2013.01); *C08L 2312/00* (2013.01)

(58) Field of Classification Search
CPC ............... C08J 2467/04; C08J 2471/02; C08J 2300/21; C08G 18/10; C08G 18/244; C08G 18/246; C08G 18/283; C08G 18/4825; C08G 18/4887; C08G 18/6484; C08G 18/7642; C08G 83/007; C09D 175/04
See application file for complete search history.

(56) References Cited

U.S. PATENT DOCUMENTS

| | | | |
|---|---|---|---|
| 2011/0124823 | A1 | 5/2011 | Hayashi et al. |
| 2012/0316278 | A1 | 12/2012 | Inoue et al. |
| 2014/0296450 | A1 | 10/2014 | Hayashi et al. |
| 2019/0382576 | A1 | 12/2019 | Okada et al. |
| 2020/0129447 | A1* | 4/2020 | Chu .................... C08G 18/3876 |
| 2021/0122874 | A1* | 4/2021 | Shimizu ............. C08G 18/7642 |
| 2021/0379877 | A1* | 12/2021 | Takano ................... B32B 27/08 |

FOREIGN PATENT DOCUMENTS

| | | |
|---|---|---|
| JP | 2018-021161 A | 2/2018 |
| JP | 2018-145388 A | 9/2018 |
| JP | 2020-090555 A | 6/2020 |
| WO | 2005/080469 A1 | 9/2005 |
| WO | 2010/024431 A1 | 3/2010 |
| WO | 2011/108514 A1 | 9/2011 |
| WO | 2012/165402 A1 | 12/2012 |

OTHER PUBLICATIONS

Notification Concerning Transmittal of International Preliminary Report on Patentability dated Jan. 6, 2022, Issued in corresponding International Patent Application No. PCT/JP2020/023007.

International Preliminary Report on Patentability dated Dec. 28, 2021, issued in corresponding International Patent Application No. PCT/JP2020/023007.

Notification of Transmittal of Translation of the International Preliminary Report on Patentability dated Jan. 6, 2022, issued in corresponding International Patent Application No. PCT/JP2020/023007.

English Translation of International Preliminary Report on Patentability dated Dec. 28, 2021, issued in corresponding International Patent Application No. PCT/JP2020/023007.

* cited by examiner

F I G. 1
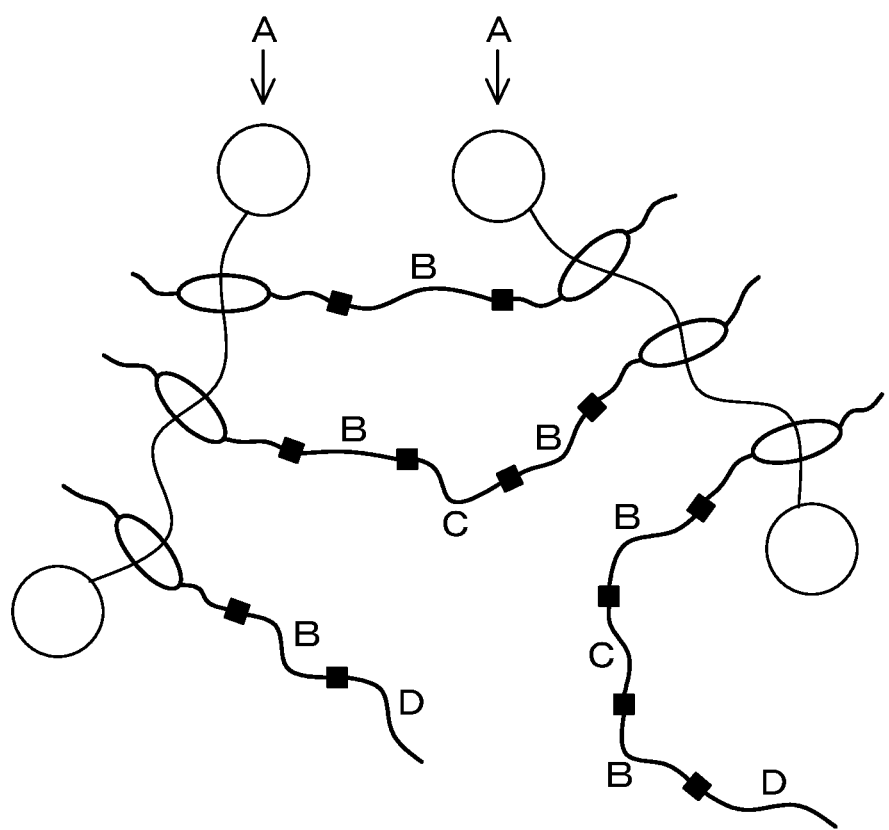

F I G. 2
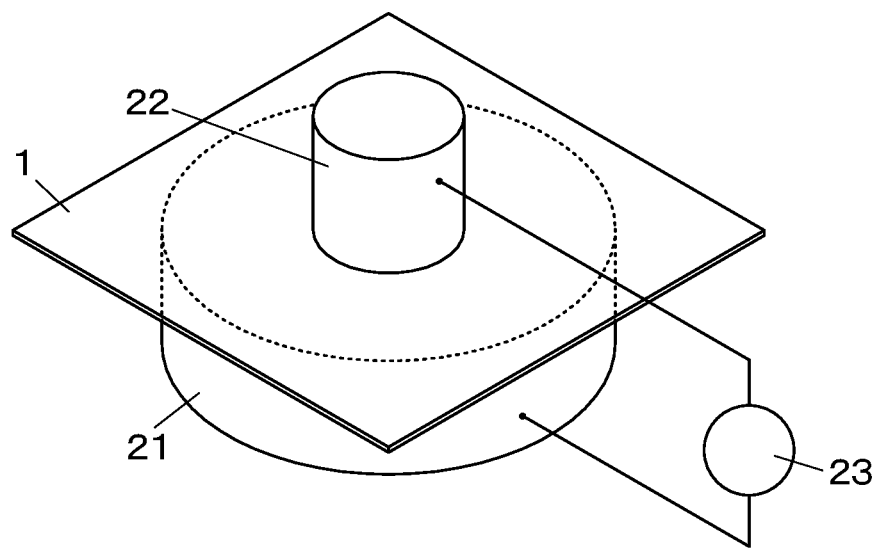

ELASTOMER COMPOSITION AND ACTUATOR AND SENSOR

CROSS REFERENCE TO RELATED APPLICATIONS

This application is a U.S. national stage application of PCT/JP2020/023007 filed on Jun. 11, 2020, and claims priority to Japanese Patent Application No. 2019-116461 filed on Jun. 24, 2019, the disclosures of which are incorporated herein by reference.

TECHNICAL FIELD

The present invention relates to an elastomer composition, and an actuator and a sensor, which are formed of the composition.

BACKGROUND

A polyrotaxane is a molecular assembly having a structure wherein a straight chain molecule slidably penetrates through a cyclic molecule, and the cyclic molecule is prevented from being removed by a blocking group disposed at both ends of the straight chain molecule. A polyrotaxane is also called "slide-ring material." A polyrotaxane is expected to be used in various applications, since it exhibits viscoelasticity resulting from sliding of the cyclic molecule on the straight chain molecule.

In particular, a crosslinked polyrotaxane prepared by crosslinking of two polyrotaxane cyclic molecules with a crosslinking moiety present therebetween (Patent Document 1) is expected to be applied to (dielectric elastomer) actuators or (dielectric elastomer) sensors, since the crosslinked polyrotaxane can serve as an elastomer exhibiting low elastic modulus in a low deformation region because of the viscoelasticity of the crosslinked polyrotaxane.

Patent Document 2 discloses a crosslinked polyrotaxane, wherein a cyclic molecule has an active group, a crosslinking moiety has a reactive group at both ends of a polymer moiety, and the crosslinkage is formed through reaction between the active group and the reactive groups. The crosslinked polyrotaxane can be provided with, for example, compatibility or functionality by providing the cyclic molecule with, for example, a hydroxypropyl group or a polycaprolactone group besides the active group. According to the patent document, the polymer moiety has a molecular weight of 1,000 or more, preferably 2,000 or more, more preferably 3,000 or more. The patent document describes many examples involving the use of different groups of the cyclic molecule or different polymer moieties. In Example 12 of the patent document, a polyrotaxane having introduced hydroxypropyl and polycaprolactone groups, polyethylene glycol diol (Mn=1,000), and polyethylene glycol monomethyl ether (Mn=1,100) are dissolved in dimethylformamide; the resultant solution is mixed with an isocyanurate form of hexamethylene diisocyanate; and then the resultant mixture is allowed to stand still at 60° C., to thereby prepare a solvent-free crosslinked product. However, the crosslinked product does not exhibit an initial elastic modulus falling within an appropriate range according to the present invention.

Patent Document 3 also discloses a crosslinked polyrotaxane. In Example 2 of the patent document, a polyrotaxane having introduced hydroxypropyl and polycaprolactone groups is dissolved in dimethylformamide; the resultant solution is mixed with dibutyl tin dilaurate and a crosslinking agent containing polypropylene glycol wherein both ends are modified with isocyanate and polypropylene glycol monobutyl ether wherein one end is modified with isocyanate; and the resultant mixture is stirred and then allowed to stand still at 50° C., to thereby prepare a solvent-free crosslinked product containing polypropylene glycol (Mn=3,000) and/or polypropylene glycol monobutyl ether (Mn=2,500) between molecules of the polyrotaxane. However, the crosslinked product does not exhibit an initial elastic modulus falling within an appropriate range according to the present invention.

Patent Document 4 discloses a urethane resin cured product potentially containing a polyrotaxane. In Examples 2 and 9 of the patent document, a specific poly(thi)ol compound prepared through preliminary mixing of a polyrotaxane having on its side chain a hydroxyl group and polypropylene glycol monomethyl ether (Mw=439) is mixed with a specific primary phosphate ester compound and N,N-diisopropylethylamine; the resultant mixture is mixed with a specific polyiso (thio) cyanate compound; and the resultant mixture is gradually heated, to thereby prepare a cured product. The patent document does not describe mechanical properties (except for L-scale Rockwell hardness) of the cured product.

PATENT DOCUMENTS

Patent Document 1: Japanese Unexamined Patent Application Publication No. 2011-241401 (JP 2011-241401 A)
Patent Document 2: International Publication WO 2010/024431
Patent Document 3: International Publication WO 2011/108514
Patent Document 4: Japanese Unexamined Patent Application Publication No. 2018-21161 (JP 2018-21161 A)

SUMMARY

In view of the foregoing, an object of the present invention is to provide an elastomer which is suitable for application in actuators or sensors, and which exhibits an appropriately low initial elastic modulus in a low deformation region.

The present inventors have found that crosslinking density can be reduced when a crosslinking agent having a higher molecular weight than a conventional one is used for a polyrotaxane (hitherto, a crosslinking agent having an Mn of about 700 has been often used for a polyrotaxane), and have also found that crosslinking density can be further reduced by using, for example, a diol having at its both ends a reactive group and, for example, a monool having at its one end a reactive group. The present invention has been accomplished on the basis of these findings and additional studies.

[1] Elastomer Composition

An elastomer composition comprising the following components (A) to (D):
component (A): a polyrotaxane containing a first linear molecule, a cyclic molecule through which the first linear molecule penetrates, and a blocking group disposed at both ends of the first linear molecule;
component (B): a crosslinking agent containing a second linear molecule having a molecular weight of 1,200 to 7,000, and a functional group disposed at both ends of the second linear molecule;
component (C): a double-reactive component containing a third linear molecule having a molecular weight of 300 to 3,000, and a reactive group disposed at both ends of the third linear molecule and capable of reacting with the functional group; and component (D): a single-reactive component containing a fourth linear molecule having a molecular weight of 300 to 3,000, and a reactive group disposed at only one end of the fourth linear molecule and capable of reacting with the functional group, wherein at least a portion of the functional group in the component (B) is directly or indirectly bonded to the cyclic molecule in the component (A), and the elastomer composition exhibits an initial elastic modulus of 0.6 to 2 MPa.

(Effects)

An elastomer composition having a structure schematically shown in FIG. 1 is produced by using the crosslinking agent (B) having a higher molecular weight than a conventionally used one for crosslinking of a polyrotaxane, and by adding the double-reactive component (C) containing a reactive group disposed at both ends of the linear molecule, and the single-reactive component (D) containing a reactive group disposed at only one end of the linear molecule. The elastomer composition exhibits an initial elastic modulus of 0.6 to 2 MPa resulting from reduced crosslinking density.

The second linear molecule preferably has a molecular weight of 2,600 to 6,700.

The elastomer composition preferably exhibits a hysteresis loss of 5% or less.

Each of the first to fourth linear molecules is preferably an aliphatic polyether, an aliphatic polyester, an aliphatic polycarbonate, or a block polymer containing any of these.

The functional group is preferably a blocked isocyanate.

The reactive group is preferably a hydroxyl group.

The amount of the component (B) is preferably 150 to 600 parts by weight relative to 100 parts by weight of the component (A).

Preferably, the total amount of the component (C) and the component (D) is 30 to 200 parts by weight relative to 100 parts by weight of the component (A), and the ratio by weight of the component (C) to the component (D) is 10/90 to 90/10.

[2] (Dielectric Elastomer) Actuator

An actuator comprising a structure including a film formed of the elastomer composition according to [1] above or a preferred embodiment thereof, and an elastomer electrode layer disposed on both surfaces of the film.

No particular limitation is imposed on the elastomer electrode layer, and the elastomer electrode layer may be, for example, an electrode layer formed of an elastomer (e.g., silicone, natural rubber, urethane rubber, or crosslinked polyrotaxane) containing electrically conductive particles of platinum, carbon, silver, etc.

[3] (Dielectric Elastomer) Sensor

A sensor comprising a structure including a film formed of the elastomer composition according to [1] above or a preferred embodiment thereof, and an elastomer electrode layer disposed on both surfaces of the film.

No particular limitation is imposed on the elastomer electrode layer, and the elastomer electrode layer may be, for example, an electrode layer formed of an elastomer (e.g., silicone, natural rubber, urethane rubber, or crosslinked polyrotaxane) containing electrically conductive particles of platinum, carbon, silver, etc.

The present invention can provide an elastomer which is suitable for application in actuators or sensors, and which exhibits an appropriately low initial elastic modulus in a low deformation region.

BRIEF DESCRIPTION OF THE DRAWINGS

FIG. 1 is a schematic view showing the structure of the elastomer composition of the present invention;

FIG. 2 is an explanatory view showing a dielectric breakdown test performed on the elastomer composition.

DETAILED DESCRIPTION

1. Polyrotaxane (A)

Figure 3:
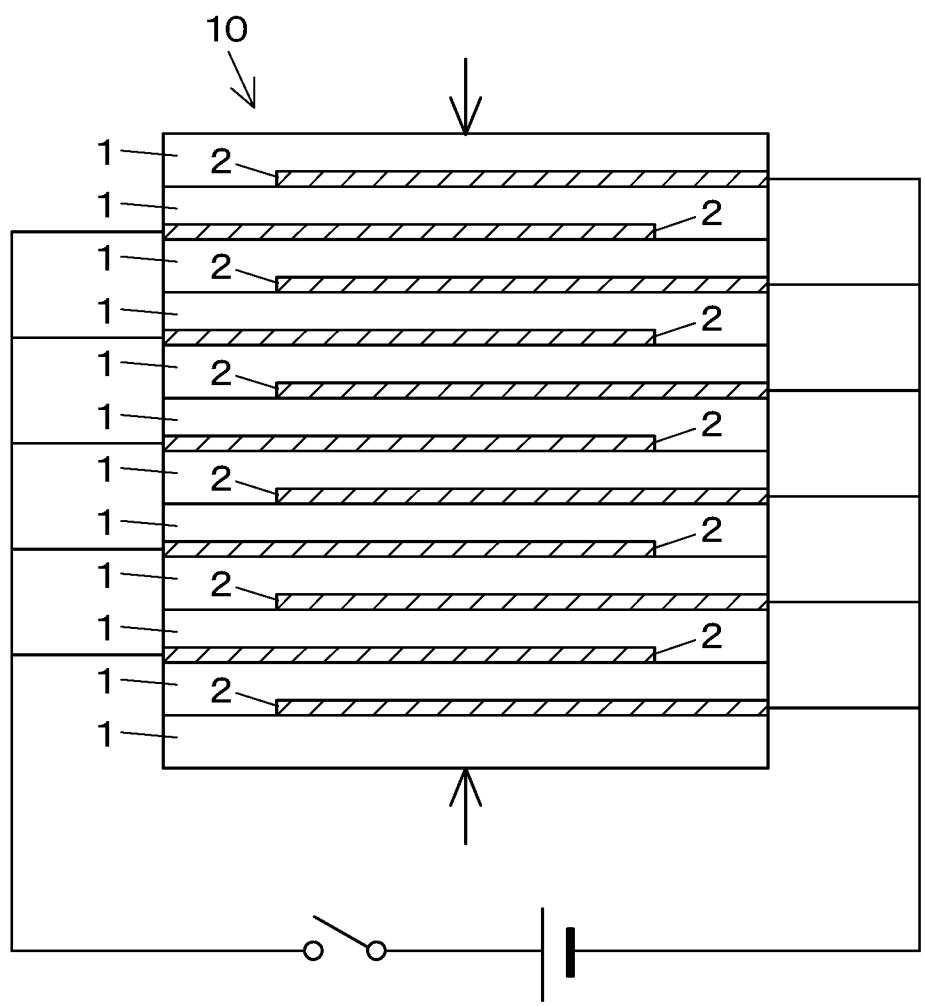
FIG. 3 is a cross-sectional view of an actuator formed of the elastomer composition.

Examples of the cyclic molecule include, but are not particularly limited to, cyclodextrin, crown ether, cyclophane, calixarene, cucurbituril, and cyclic amide. The cyclic molecule is preferably cyclodextrin, and particularly preferably selected from among α-cyclodextrin, β-cyclodextrin, and γ-cyclodextrin. The cyclic molecule may contain cyclodextrin and another cyclic molecule. Some of hydroxyl groups of cyclodextrin may be substituted by another group, such as —SH, —NH$_2$, —COOH, —SO$_3$H, or —PO$_4$H, or may be substituted by a substituent having a graft chain (e.g., a graft chain formed through ring-opening polymerization of a lactone monomer) so as to be solubilized in various organic solvents. The most preferred cyclic molecule may be cyclodextrin having polycaprolactone as a graft chain having 20 or more chains.

Examples of the first linear molecule (straight chain molecule) include, but are not particularly limited to, polyethylene glycol, polylactic acid, polyisoprene, polyisobutylene, polybutadiene, polypropylene glycol, polytetrahydrofuran, polydimethylsiloxane, polyethylene, polypropylene, polyvinyl alcohol, and polyvinyl methyl ether. The straight chain molecule is preferably polyethylene glycol, and may contain polyethylene glycol and another straight chain molecule.

Examples of the blocking group include, but are not particularly limited to, dinitrophenyl group, cyclodextrin group, adamantane group, trityl group, fluorescein group, pyrene group, substituted benzene group (the substituent may be, for example, alkyl, alkyloxy, hydroxy, halogen, cyano, sulfonyl, carboxyl, amino, or phenyl; one or more substituents may be present), optionally substituted polynuclear aromatic group (the substituent may be, for example, the same as those described above; one or more substituents may be present), and steroid group. The blocking group is preferably selected from the group consisting of dinitrophenyl group, cyclodextrin group, adamantane group, trityl group, fluorescein group, and pyrene group, and is more preferably adamantane group or trityl group.

2. Crosslinking Agent (B)

No particular limitation is imposed on the second linear molecule. As described above, the second linear molecule is preferably an aliphatic polyether, an aliphatic polyester, an aliphatic polycarbonate, or a block polymer containing any of these.

Examples of the functional group include, but are not particularly limited to, an isocyanate and a blocked isocyanate. As described above, the functional group is preferably a blocked isocyanate.

3. Double-Reactive Component (C)

No particular limitation is imposed on the third linear molecule. As described above, the third linear molecule is preferably an aliphatic polyether, an aliphatic polyester, an aliphatic polycarbonate, or a block polymer containing any of these.

Examples of the reactive group include, but are not particularly limited to, a hydroxyl group, an amino group, and a thiol group. As described above, the reactive group is preferably a hydroxyl group.

4. Single-Reactive Component

No particular limitation is imposed on the fourth linear molecule. As described above, the fourth linear molecule is preferably an aliphatic polyether, an aliphatic polyester, an aliphatic polycarbonate, or a block polymer containing any of these.

Examples of the reactive group include, but are not particularly limited to, a hydroxyl group, an amino group, and a thiol group. As described above, the reactive group is preferably a hydroxyl group.

EXAMPLES

Embodiments of the present invention; i.e., examples of the elastomer composition of the invention will be described in the following order. The present invention should not be construed as being limited to the examples.
<1> Preparation of Polyrotaxane (A)
<2> Preparation of Crosslinking Agent (B)
<3> Double-Reactive Component (C)
<4> Single-Reactive Component (D)
<5> Preparation of Elastomer Composition Solution
<6> Production of Elastomer Composition Formed Body (Crosslinked Polyrotaxane)
<7> Measurement of Physical Properties of Elastomer Composition Formed Body
<8> Production of Actuator (or Sensor)
  <1> Preparation of Polyrotaxane (A)

Firstly, the hydroxypropyl-group-modified polyrotaxane (hereinafter may be abbreviated as "HAPR") disclosed in International Publication WO 2005/080469 (which is referred to in Patent Document 1) was prepared as a polyrotaxane containing cyclodextrin as a cyclic molecule, polyethylene glycol as a straight chain molecule, and a blocking group disposed at both ends of the straight chain molecule.

Subsequently, a polyrotaxane having a caprolactone group was prepared by the method described below so as to achieve solubility and compatibility. A three-necked flask was charged with 10 g of the aforementioned HAPR, and 45 g of ε-caprolactone was added to the flask under a slow stream of nitrogen. The resultant mixture was homogeneously stirred with a mechanical stirrer at 100° C. for 30 minutes, and then the reaction temperature was increased to 130° C. Subsequently, 1.6 g of tin 2-ethylhexanoate previously diluted with toluene (50 wt % solution) was added to the mixture, and reaction was allowed to proceed for five hours, followed by removal of the solvent, to thereby prepare 55 g of polyrotaxane (A) having a caprolactone group (hereinafter may be abbreviated as "HAPR-g-PCL"). The cyclic molecule has polycaprolactone (having about 35 chains) as a graft chain. Polyrotaxane (A) was found to have a weight average molecular weight Mw of 580,000 and a molecular weight distribution Mw/Mn of 1.5 by GPC. Polyrotaxane (A) was found to have a hydroxyl value of 72 mg KOH/g as measured by the method according to JIS K0070-1992.

<2> Preparation of Crosslinking Agent (B)

The following five crosslinking agents B' and B1 to B4 (solutions) were prepared.

<2-1> Crosslinking Agent (B'): 1.0-mer

A three-necked eggplant flask was charged with 91.57 g of TAKENATE 600 (available from Mitsui Chemicals, Inc.), followed by stirring in an oil bath at 80° C. under a stream of nitrogen. Subsequently, 110 g of Polypropylene glycol 700 (diol type) was slowly added dropwise to the solution in the flask over two hours, and then the resultant mixture was further stirred for two hours. After completion of the reaction, the liquid temperature was decreased to 40° C., and then 76.58 g of 2-butanone oxime (available from Tokyo Chemical Industry Co., Ltd.) was slowly added dropwise to the reaction mixture so that the liquid temperature did not reach 60° C. or higher. After completion of the dropwise addition, the resultant mixture was further stirred at 40° C. for five hours, to thereby prepare a solution containing crosslinking agent (B') (Mn=950) composed of polypropylene glycol having at its ends blocked isocyanate groups.

<2-2> Crosslinking Agent (B1): 1.0-mer (modified)

A three-necked eggplant flask was charged with 500 g of Polypropylene glycol 700 (diol type) (available from FUJIFILM Wako Pure Chemical Corporation) and 430 g of Placcel M (ε-caprolactone monomer) (available from Daicel Corporation), followed by stirring in an oil bath at 110° C. under a stream of nitrogen for two hours. The oil bath was heated to 130° C., and then 0.5 g of tin 2-ethylhexanoate (available from Aldrich) was added, followed by stirring for 10 hours, to thereby prepare polypropylene glycol having both ends grafted with polycaprolactone (hereinafter may be referred to as "oligomer 1") (Mn=1,710).

A three-necked eggplant flask was charged with 35.8 g of TAKENATE 600 (available from Mitsui Chemicals, Inc.), followed by stirring in an oil bath at 90° C. under a stream of nitrogen. Subsequently, a solution of 80 g of the aforementioned polypropylene glycol having both ends grafted with polycaprolactone in 80 g of toluene was slowly added dropwise to the solution in the flask over two hours, and then the resultant mixture was further stirred for two hours. After completion of the reaction, the liquid temperature was decreased to 40° C., and then 23.55 g of 2-butanone oxime (available from Tokyo Chemical Industry Co., Ltd.) was slowly added dropwise to the reaction mixture so that the liquid temperature did not reach 60° C. or higher. After completion of the dropwise addition, the resultant mixture was further stirred at 40° C. for five hours, to thereby prepare a solution containing crosslinking agent (B1) (Mn=2,719) composed of polypropylene glycol having at its ends blocked isocyanate groups.

<2-3> Crosslinking Agent (B2): 2.0-mer (modified)

A three-necked eggplant flask was charged with 100 g of the aforementioned oligomer 1, followed by stirring in an oil bath at 90° C. under a stream of nitrogen. Subsequently, 7.45 g of TAKENATE 600 was slowly added dropwise to the solution in the flask over one hour, and then the resultant mixture was further stirred for two hours, to thereby prepare oligomer 2 (Mn=3, 982).

A three-necked eggplant flask was charged with 16.66 g of TAKENATE 600 (available from Mitsui Chemicals, Inc.), followed by stirring in an oil bath at 90° C. under a stream of nitrogen. Subsequently, a solution of 80 g of the aforementioned oligomer 2 in 80 g of toluene was slowly added dropwise to the solution in the flask over two hours, and then the resultant mixture was further stirred for two hours. After completion of the reaction, the liquid temperature was decreased to 40° C., and then 10.95 g of 2-butanone oxime (available from Tokyo Chemical Industry Co., Ltd.) was slowly added dropwise to the reaction mixture so that the liquid temperature did not reach 60° C. or higher. After completion of the dropwise addition, the resultant mixture was further stirred at 40° C. for five hours, to thereby prepare a solution containing crosslinking agent (B2) (Mn=5,422) composed of polypropylene glycol having at its ends blocked isocyanate groups.

<2-4> Crosslinking Agent (B3): 2.3-mer (modified)

A three-necked eggplant flask was charged with 100 g of the aforementioned oligomer 1, followed by stirring in an oil bath at 90° C. under a stream of nitrogen. Subsequently, 8.43 g of TAKENATE 600 was slowly added dropwise to the solution in the flask over one hour, and then the resultant mixture was further stirred for two hours, to thereby prepare oligomer 3 (Mn=4, 537).

A three-necked eggplant flask was charged with 14.36 g of TAKENATE 600 (available from Mitsui Chemicals, Inc.), followed by stirring in an oil bath at 90° C. under a stream of nitrogen. Subsequently, a solution of 80 g of the aforementioned oligomer 3 in 80 g of toluene was slowly added dropwise to the solution in the flask over two hours, and then the resultant mixture was further stirred for two hours. After completion of the reaction, the liquid temperature was decreased to 40° C., and then 9.44 g of 2-butanone oxime (available from Tokyo Chemical Industry Co., Ltd.) was slowly added dropwise to the reaction mixture so that the liquid temperature did not reach 60° C. or higher. After completion of the dropwise addition, the resultant mixture was further stirred at 40° C. for five hours, to thereby prepare a solution containing crosslinking agent (B3) (Mn=5,977) composed of polypropylene glycol having at its ends blocked isocyanate groups.

<2-5> Crosslinking Agent (B4): 2.5-mer (modified)

A three-necked eggplant flask was charged with 100 g of the aforementioned oligomer 1, followed by stirring in an oil bath at 90° C. under a stream of nitrogen. Subsequently, 8.95 g of TAKENATE 600 was slowly added dropwise to the solution in the flask over one hour, and then the resultant mixture was further stirred for two hours, to thereby prepare oligomer 4 (Mn=4,939).

A three-necked eggplant flask was charged with 13.14 g of TAKENATE 600 (available from Mitsui Chemicals, Inc.), followed by stirring in an oil bath at 90° C. under a stream of nitrogen. Subsequently, a solution of 80 g of the aforementioned oligomer 4 in 80 g of toluene was slowly added dropwise to the solution in the flask over two hours, and then the resultant mixture was further stirred for two hours. After completion of the reaction, the liquid temperature was decreased to 40° C., and then 8.65 g of 2-butanone oxime (available from Tokyo Chemical Industry Co., Ltd.) was slowly added dropwise to the reaction mixture so that the liquid temperature did not reach 60° C. or higher. After completion of the dropwise addition, the resultant mixture was further stirred at 40° C. for five hours, to thereby prepare a solution containing crosslinking agent (B4) (Mn=6,496) composed of polypropylene glycol having at its ends blocked isocyanate groups.

<3> Double-Reactive Component (C)

The following two double-reactive components were used.

<3-1> Double-Reactive Component (C1)

Polypropylene glycol 700 (diol type) (available from Wako Pure Chemical Industries, Ltd.) was used as is.

<3-2> Double-Reactive Component (C2)

Oligomer 2 prepared in <2-3> above was used.

<4> Single-Reactive Component (D)

The following two single-reactive components were used.

<4-1> Single-Reactive Component (D1)

Polypropylene glycol 1K (monool type) (available from Wako Pure Chemical Industries, Ltd.) was used as is.

<4-2> Single-Reactive Component (D2)

Polypropylene glycol 340 (monool type) (available from Wako Pure Chemical Industries, Ltd.) was used as is.

<5> Preparation of Elastomer Composition Solution

The products prepared in (A), (Bx), (Cx), and (Dx) above were selectively used in amounts (represented by "mass (g)") shown in Table 1 below, to thereby prepare elastomer composition solutions of Examples and Comparative Examples. In each of the Examples, the amount of a hydroxyl group is equal to that of an isocyanate.

TABLE 1

| | | Comparative Example 1 | Comparative Example 2 | Comparative Example 3 |
|---|---|---|---|---|
| Amounts Unit: g Parts by mass in parentheses | Polyrotaxane (A): HAPR-g-PCL | 18.1 (100) | 16.1 (100) | 8.9 (100) |
| | Crosslinking Agent (B'): 1.0-mer Mn = 950 | 27.2 (150) | — | — |
| | Crosslinking Agent (B1): 1.0-mer (modified) Mn = 2719 | — | 38.3 (239) | — |
| | Crosslinking Agent (B2): 2.0-mer (modified) Mn = 5422 | — | — | 25.5 (286) |
| | Crosslinking Agent (B3): 2.3-mer (modified) Mn = 5977 | — | — | — |
| | Crosslinking Agent (B4): 2.5-mer (modified) Mn = 6496 | — | — | — |
| | Double-Reactive Component (C1): PPG 700 diol | 10.7 (59.4) | 7.5 (47) | — |
| | Double-Reactive Component (C2): Oligomer 2 (Mn = 3982) was used. | — | — | 18.8 (212) |
| | Single-Reactive Component (D1): PPG 1K monool | — | — | — |
| | Single-Reactive Component (D2): PPG 340 monool | — | — | — |
| | Solvent: Toluene | 61 | — | 55 |
| | Antioxidant: Thanox 1726 | — | 1.0 | — |
| | Catalyst: Dibutyltin dilaurate | 0.8 | 0.8 | 0.8 |
| | Silicone Additive: DBL-C31 | 0.8 | 0.9 | 0.8 |
| | Hydrolysis Inhibitor: CARBODILITE V-09GB | — | 1.6 | — |
| Amount Ratio | (C + D)/A | | | |
| | C/(C + D) | | | |
| Properties | Relative Dielectric Constant | | | |
| | Initial Elastic Modulus (Mpa) | 3.3 | 3.6 | 2.2 |
| | Breaking Strength (Mpa) | | 9.5 | |
| | Hysteresis Loss (%) | 1 | 0.2 | 5.7 |
| | Dielectric Breakdown Field Strength (V/μm) | | | |

TABLE 1-continued

|  |  | Example 1 | Example 2 | Example 3 |
|---|---|---|---|---|
| Amounts Unit: g Parts by mass in parentheses | Polyrotaxane (A): HAPR-g-PCL | 15.3 (100) | 10.9 (100) | 10.9 (100) |
|  | Crosslinking Agent (B'): 1.0-mer Mn = 950 | — | — | — |
|  | Crosslinking Agent (B1): 1.0-mer (modified) Mn = 2719 | 36.3 (237) | — | — |
|  | Crosslinking Agent (B2): 2.0-mer (modified) Mn = 5422 | — | 27.3 (251) | — |
|  | Crosslinking Agent (B3): 2.3-mer (modified) Mn = 5977 | — | — | 54.0 (496) |
|  | Crosslinking Agent (B4): 2.5-mer (modified) Mn = 6496 | — | — | — |
|  | Double-Reactive Component (C1): PPG 700 diol | 3.6 (24) | 2.5 (23) | 2.5 (23) |
|  | Double-Reactive Component (C2): Oligomer 2 (Mn = 3982) was used. | — | — | — |
|  | Single-Reactive Component (D1): PPG 1K monool | 10.2 (67) | 7.2 (67) | 7.2 (66) |
|  | Single-Reactive Component (D2): PPG 340 monool | — | — | — |
|  | Solvent: Toluene | 36 | 48 | 21 |
|  | Antioxidant: Thanox 1726 | 1.1 | 1.0 | 1.0 |
|  | Catalyst: Dibutyltin dilaurate | 0.9 | 0.8 | 0.9 |
|  | Silicone Additive: DBL-C31 | 0.9 | 0.8 | 0.9 |
|  | Hydrolysis Inhibitor: CARBODILITE V-09GB | 1.7 | 1.6 | 1.6 |
| Amount Ratio | (C + D)/A | 0.90 | 0.90 | 0.90 |
|  | C/(C + D) | 0.26 | 0.26 | 0.26 |
| Properties | Relative Dielectric Constant | 8.5 | 8.2 | 7.3 |
|  | Initial Elastic Modulus (Mpa) | 1.1 | 0.9 | 0.7 |
|  | Breaking Strength (Mpa) | 1.3 | — | 0.9 |
|  | Hysteresis Loss (%) | 0.2 | 2.9 | 2.0 |
|  | Dielectric Breakdown Field Strength (V/μm) | 66 | 59 | 59 |

|  |  | Example 4 | Example 5 | Example 6 |
|---|---|---|---|---|
| Amounts Unit: g Parts by mass in parentheses | Polyrotaxane (A): HAPR-g-PCL | 12.0 (100) | 10.4 (100) | 11.5 (100) |
|  | Crosslinking Agent (B'): 1.0-mer Mn = 950 | — | — | — |
|  | Crosslinking Agent (B1): 1.0-mer (modified) Mn = 2719 | — | — | — |
|  | Crosslinking Agent (B2): 2.0-mer (modified) Mn = 5422 | — | — | — |
|  | Crosslinking Agent (B3): 2.3-mer (modified) Mn = 5977 | 59.7 (498) | — | — |
|  | Crosslinking Agent (B4): 2.5-mer (modified) Mn = 6496 | — | 55.9 (538) | 61.5 (537) |
|  | Double-Reactive Component (C1): PPG 700 diol | 2.8 (23) | 2.4 (23) | 2.7 (23) |
|  | Double-Reactive Component (C2): Oligomer 2 (Mn = 3982) was used. | — | — | — |
|  | Single-Reactive Component (D1): PPG 1K monool | — | 7.0 (67) | — |
|  | Single-Reactive Component (D2): PPG 340 monool | 2.7 (23) | — | 2.6 (23) |
|  | Solvent: Toluene | 18 | 20 | 17 |
|  | Antioxidant: Thanox 1726 | 1.1 | 0.9 | 1.0 |
|  | Catalyst: Dibutyltin dilaurate | 0.9 | 0.8 | 0.8 |
|  | Silicone Additive: DBL-C31 | 0.9 | 0.8 | 0.8 |
|  | Hydrolysis Inhibitor: CARBODILITE V-09GB | 1.8 | 1.5 | 1.7 |
| Amount Ratio | (C + D)/A | 0.46 | 0.90 | 0.46 |
|  | C/(C + D) | 0.51 | 0.26 | 0.50 |

TABLE 1-continued

| Properties | | | | |
|---|---|---|---|---|
| Relative Dielectric Constant | 8.6 | 4.9 | 8.3 |
| Initial Elastic Modulus (Mpa) | 1.1 | 0.9 | 1.9 |
| Breaking Strength (Mpa) | 3.4 | 2.2 | 6.4 |
| Hysteresis Loss (%) | 4.5 | 1.9 | 4.7 |
| Dielectric Breakdown Field Strength (V/μm) | | | 76 |

The solvent used was toluene.

The antioxidant used was "Thanox 1726" available from Rianlon Corp.

The catalyst (for deprotection) used was dibutyltin dilaurate (solution).

The silicone additive used was "DBL-C31" (both-end alcohol-modified silicone: caprolactone-dimethylsiloxane-caprolactone block copolymer) (in the form of solution, solid content: 30% by mass) available from GELEST.

The hydrolysis inhibitor used was "CARBODILITE V-09GB" (in the form of solution, solid content: 30% by mass) available from Nisshinbo Chemical Inc.

<5-1> Preparation in Comparative Example 1

Firstly, 18.1 g of polyrotaxane (A), 27.2 g of crosslinking agent (B') solution, and 10.7 g of double-reactive component (C1) were dissolved in 61 g of a solvent, and the resultant solution was stirred to thereby prepare a homogenous solution. To the solution were added 0.8 g of the catalyst and 0.8 g of the silicone additive. The resultant mixture was stirred to thereby prepare a homogenous solution.

<5-2> Preparation in Comparative Example 2

Firstly, 16.1 g of polyrotaxane (A), 38.3 g of crosslinking agent (B1) solution, and 7.5 g of double-reactive component (C1) were stirred to thereby prepare a homogenous solution. To the solution were added 1.0 g of the antioxidant, 0.8 g of the catalyst, 0.9 g of the silicone additive, and 1.6 g of the hydrolysis inhibitor. The resultant mixture was stirred to thereby prepare a homogenous solution.

<5-3> Preparation in Comparative Example 3

Firstly, 8.9 g of polyrotaxane (A), 25.5 g of crosslinking agent (B2) solution, and 18.8 g of double-reactive component (C2) were dissolved in 55 g of a solvent, and the resultant solution was stirred to thereby prepare a homogenous solution. To the solution were added 0.8 g of the catalyst and 0.8 g of the silicone additive. The resultant mixture was stirred to thereby prepare a homogenous solution.

<5-4> Preparation in Example 1

Firstly, 15.3 g of polyrotaxane (A), 36.3 g of crosslinking agent (B1) solution, 3.6 g of double-reactive component (C1), and 10.2 g of single-reactive component (D1) were dissolved in a solvent, and the resultant solution was stirred to thereby prepare a homogenous solution. To the solution were added 1.1 g of the antioxidant, 0.9 g of the catalyst, 0.9 g of the silicone additive, and 1.7 g of the hydrolysis inhibitor. The resultant mixture was stirred to thereby prepare a homogenous solution.

<5-5> Preparation in Example 2

Firstly, 10.9 g of polyrotaxane (A), 27.3 g of crosslinking agent (B2) solution, 2.5 g of double-reactive component (C1), and 7.2 g of single-reactive component (D1) were dissolved in a solvent, and the resultant solution was stirred to thereby prepare a homogenous solution. To the solution were added 1.0 g of the antioxidant, 0.8 g of the catalyst, 0.8 g of the silicone additive, and 1.6 g of the hydrolysis inhibitor. The resultant mixture was stirred to thereby prepare a homogenous solution.

<5-6> Preparation in Example 3

Firstly, 10.9 g of polyrotaxane (A), 54 g of crosslinking agent (B3) solution, 2.5 g of double-reactive component (C1), and 7.2 g of single-reactive component (D1) were dissolved in a solvent, and the resultant solution was stirred to thereby prepare a homogenous solution. To the solution were added 1.0 g of the antioxidant, 0.9 g of the catalyst, 0.9 g of the silicone additive, and 1.6 g of the hydrolysis inhibitor. The resultant mixture was stirred to thereby prepare a homogenous solution.

<5-7> Preparation in Example 4

Firstly, 12 g of polyrotaxane (A), 54.7 g of crosslinking agent (B3) solution, 2.8 g of double-reactive component (C1), and 2.7 g of single-reactive component (D2) were dissolved in a solvent, and the resultant solution was stirred to thereby prepare a homogenous solution. To the solution were added 1.1 g of the antioxidant, 0.9 g of the catalyst, 0.9 g of the silicone additive, and 1.8 g of the hydrolysis inhibitor. The resultant mixture was stirred to thereby prepare a homogenous solution.

<5-8> Preparation in Example 5

Firstly, 10.4 g of polyrotaxane (A), 55.9 g of crosslinking agent (B4) solution, 2.4 g of double-reactive component (C1), and 7.0 g of single-reactive component (D1) were dissolved in a solvent, and the resultant solution was stirred to thereby prepare a homogenous solution. To the solution were added 0.9 g of the antioxidant, 0.8 g of the catalyst, 0.8 g of the silicone additive, and 1.5 g of the hydrolysis inhibitor. The resultant mixture was stirred to thereby prepare a homogenous solution.

<5-9> Preparation in Example 6

Firstly, 11.5 g of polyrotaxane (A), 61.5 g of crosslinking agent (B4) solution, 2.7 g of double-reactive component (C1), and 2.6 g of single-reactive component (D2) were dissolved in a solvent, and the resultant solution was stirred to thereby prepare a homogenous solution. To the solution were added 1.0 g of the antioxidant, 0.8 g of the catalyst, 0.8 g of the silicone additive, and 1.7 g of the hydrolysis inhibitor. The resultant mixture was stirred to thereby prepare a homogenous solution.

<6> Production of Elastomer Composition Formed Body (Crosslinked Polyrotaxane)

Each of the elastomer composition solutions of the Examples and the Comparative Examples prepared in <5> above was thoroughly defoamed and then applied to a PET sheet by slit die coating. Thereafter, the composition solution was cured in an oven at 130° C. under reduced pressure for five hours, and then the cured product was removed from the PET sheet, to thereby produce an elastomer composition formed body (crosslinked polyrotaxane) in the form of a film. The elastomer composition formed body exhibited stretchability (i.e., capable of undergoing elastic deformation).

<7> Measurement of Physical Properties of Elastomer Composition Formed Body

The physical properties of the elastomer composition formed body of each of the Examples and the Comparative Examples were measured as described below. The results are shown in Table 1.

<7-1> Relative Dielectric Constant

Platinum (φ inner diameter: 5 mm) was vapor-deposited on each sample with an auto fine coater (JEC-3000FC, available from JEOL Ltd.), and the capacitance was measured with Pecision Impedance Analyser (4294A, available from Agilent) by using a dielectric constant measuring probe, to thereby calculate a relative dielectric constant.

<7-2> Initial Elastic Modulus and Breaking Strength

Each elastomer composition formed body (crosslinked body) was processed into a shape of dumbbell (width: 2.04 mm, initial sample length: 10 mm) to thereby prepare a measurement sample. The sample was subjected to a tensile test with "AGS-X 10N" available from SHIMADZU CORPORATION at a tensile speed of 0.2 mm/second, to thereby record a stress-strain curve. The initial elastic modulus was calculated from a slope of the linear approximation of stress-strain curves at 1% to 5% elongation. In addition, the breaking strength was measured.

<7-3> Hysteresis Loss

Similar to the case of Patent Document 1, the term "hysteresis loss" refers to the mechanical energy loss rate (hysteresis loss) determined according to JIS K6400 in one cycle of deformation and recovery of a material (wherein deformation of the material is replaced with a strain obtained by a tensile test of the material).

Specifically, a sample having a shape of dumbbell No. 7 (according to JIS K-6251) is subjected to a tensile test to thereby determine a stress-strain curve. After being expanded to 100% of the effective length, the sample is contracted to 0% at a speed equal to the expansion speed. This cycle was performed 10 times, and the hysteresis loss (the average of measurements in the first to tenth cycles) was calculated by the method for measuring and calculating an area described in Patent Document 1.

<7-4> Dielectric Breakdown Field Strength

Firstly, the thickness of an elastomer composition formed body 1 was measured. Subsequently, as shown in FIG. 2, the elastomer composition formed body 1 was attached to a disk electrode 21 on a set side, and a cylindrical electrode 22 was placed on the elastomer composition formed body 1 so that the amount of air bubbles remaining between the elastomer composition formed body 1 and the electrodes 21 and 22 was reduced to a minimum possible level, followed by deaeration treatment with a vacuum apparatus. This assembly was set in a dielectric breakdown measurement device at ambient temperature and ambient humidity, and voltage was applied between the electrodes 21 and 22 with a power supply 23 so as to achieve a voltage-increasing rate of 10 V/0.1 seconds. The dielectric breakdown field strength (V/μm) was determined from the voltage at the time when the current was 1.2 μA or more after an insulating state (i.e., substantially no flow of current). The term "ambient temperature" refers to 20±15° C., and the term "ambient humidity" refers to 65±20% (JIS-8703).

As shown in Table 1, the initial elastic modulus was 2.2 to 3.6 MPa in Comparative Examples 1 to 3, whereas the initial elastic modulus was 0.7 to 1.9 MPa in Examples 1 to 6. The hysteresis loss was 5.7% in Comparative Example 3, whereas the hysteresis loss was 5% or less in Examples 1 to 6.

<8> Production of Actuator (or Sensor)

For example, a plurality of elastomer composition formed bodies 1 of each Example and a plurality of elastomer electrode layers 2 can be alternately stacked as shown in FIG. 3, and the stacked layers can be bonded together by pressure joining, to thereby produce an actuator 10. The elastomer electrode layers 2 are composed of two groups; i.e., a group of elastomer electrode layers arranged alternately on one side in the horizontal direction, and a group of elastomer electrode layers arranged alternately on the other side in the horizontal direction. When DC voltage is applied to one group serving as a positive electrode and the other group serving as a negative electrode, the elastomer composition formed bodies 1 are contracted in a thickness direction. A change in the total height of the actuator 10 by the contraction can be used as a displacement for driving.

A sensor can also be produced through alternate stacking of the elastomer composition formed bodies 1 and the elastomer electrode layers 2 in a manner similar to that described above.

The present invention is not limited to the aforementioned examples, and may be appropriately modified and embodied without departing from the spirit of the invention.

The invention claimed is:

1. An elastomer composition comprising the following components (A) to (D):
    component (A): a polyrotaxane containing a first linear molecule, a cyclic molecule through which the first linear molecule penetrates, and a blocking group disposed at both ends of the first linear molecule;
    component (B): a crosslinking agent containing a second linear molecule having a molecular weight of 1,200 to 7,000, and a functional group disposed at both ends of the second linear molecule;
    component (C): a double-reactive component containing a third linear molecule having a molecular weight of 300 to 3,000, and a reactive group disposed at both ends of the third linear molecule and capable of reacting with the functional group; and
    component (D): a single-reactive component containing a fourth linear molecule having a molecular weight of 300 to 3,000, and a reactive group disposed at only one end of the fourth linear molecule and capable of reacting with the functional group,
    wherein at least a portion of the functional group in the component (B) is directly or indirectly bonded to the cyclic molecule in the component (A), and the elastomer composition exhibits an initial elastic modulus of 0.6 to 2 MPa.

2. The elastomer composition according to claim 1, wherein the second linear molecule has a molecular weight of 2,600 to 6,700.

3. The elastomer composition according to claim 1, wherein the elastomer composition exhibits a hysteresis loss of 5% or less.

4. The elastomer composition according to claim 1, wherein each of the first to fourth linear molecules is an aliphatic polyether, an aliphatic polyester, an aliphatic polycarbonate, or a block polymer containing any of these.

5. The elastomer composition according to claim 1, wherein the functional group is a blocked isocyanate.

6. The elastomer composition according to claim 5, wherein the reactive group is a hydroxyl group.

7. The elastomer composition according to claim 1, wherein an amount of the component (B) is 150 to 600 parts by weight relative to 100 parts by weight of the component (A).

8. The elastomer composition according to claim 1, wherein a total amount of the component (C) and the component (D) is 30 to 200 parts by weight relative to 100 parts by weight of the component (A), and a ratio by weight of the component (C) to the component (D) is 10/90 to 90/10.

9. An actuator comprising a structure including a film formed of the elastomer composition according to claim 1, and an elastomer electrode layer disposed on both surfaces of the film.

10. A sensor comprising a structure including a film formed of the elastomer composition according to claim 1, and an elastomer electrode layer disposed on both surfaces of the film.

\* \* \* \* \*